(12) United States Patent
Shinozaki et al.

(10) Patent No.: US 7,398,150 B2
(45) Date of Patent: Jul. 8, 2008

(54) METHOD OF CALCULATING THE AMOUNT OF WORK DONE BY AN INTERNAL COMBUSTION ENGINE

(75) Inventors: Koichiro Shinozaki, Saitama-ken (JP); Katsura Okubo, Saitama-ken (JP); Yuji Yasui, Saitama-ken (JP); Masahiro Sato, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/194,441

(22) Filed: Aug. 2, 2005

(65) Prior Publication Data
US 2006/0030999 A1    Feb. 9, 2006

(30) Foreign Application Priority Data
Aug. 9, 2004    (JP) .............................. 2004-232633

(51) Int. Cl.
*G01M 15/00*    (2006.01)
(52) U.S. Cl. ...................................................... 701/114
(58) Field of Classification Search ................. 701/114; 73/115
See application file for complete search history.

(56) References Cited
U.S. PATENT DOCUMENTS
3,815,410 A * 6/1974 Brown et al. .................. 73/115
4,598,680 A * 7/1986 Lanfer .................... 123/406.23
5,623,412 A    4/1997 Masson et al.

FOREIGN PATENT DOCUMENTS
EP    0 742 359 A2    11/1996
JP    2001-263153    9/2001

* cited by examiner

*Primary Examiner*—Hieu T. Vo
(74) *Attorney, Agent, or Firm*—Arent Fox LLP (57) ABSTRACT

A method of calculating the amount of work done by an internal combustion engine, which is capable of calculating a work amount parameter indicative of the amount of work done with accuracy while compensating for a phase delay in in-cylinder pressure data caused e.g. by a filtering process performed thereon. The method calculates the work amount parameter $P_{mi}$ indicative of the amount of work done by the engine 3 including a combustion chamber 3b, as follows: Pressure in the combustion chamber 3b is detected to obtain in-cylinder pressure data P indicative of the detected pressure. Volume data V indicative of a state of change in volume of the combustion chamber 3b is obtained. The obtained volume data V is subjected to a first predetermined filtering process. The work amount parameter $P_{mi}$ is calculated based on the detected in-cylinder pressure data P, and the volume data filtered value VF obtained by subjecting the volume data V to the first filtering process.

5 Claims, 9 Drawing Sheets

$$P_{mi} = \frac{1}{V_s} \oint P dV \quad \cdots\cdots (1)$$

$$dV = \frac{V_{a0}}{2} + \sum_{k=1}^{\infty} (V_{ak} \cos k\omega t + V_{bk} \sin k\omega t) \quad \cdots\cdots (2)$$

$$V_{a0} = \frac{1}{T} \int_0^T dV(t) dt \quad \cdots\cdots (3)$$

$$V_{ak} = \frac{2}{T} \int_0^T dV(t) \cos k\omega t dt \quad \cdots\cdots (4)$$

$$V_{bk} = \frac{2}{T} \int_0^T dV(t) \sin k\omega t dt \quad \cdots\cdots (5)$$

$$\frac{dV}{d\theta} = \frac{V_{a0}}{2} + \sum_{k=1}^{\infty} (V_{ak} \cos k\theta + V_{bk} \sin k\theta) \quad \cdots\cdots (6)$$

$$P_{mi} = \frac{1}{V_s} \oint P \left\{ \frac{V_{a0}}{2} + \sum_{k=1}^{\infty} (V_{ak} \cos k\theta + V_{bk} \sin k\theta) \right\} d\theta \quad \cdots\cdots (7)$$

$$P_{mi} = \frac{1}{V_s} \oint P \frac{V_{a0}}{2} d\theta + \frac{V_{a1}}{V_s} \oint P \cos\theta d\theta + \frac{V_{a2}}{V_s} \oint P \cos 2\theta d\theta + \cdots\cdots$$
$$+ \frac{V_{b1}}{V_s} \oint P \sin\theta d\theta + \frac{V_{b2}}{V_s} \oint P \sin 2\theta d\theta + \cdots\cdots \quad \cdots\cdots (8)$$

$$P_{ak} = \frac{2}{T} \int_0^T P(t) \cos k\omega t dt = \frac{2}{T} \oint P \cos k\theta d\theta \quad \cdots\cdots (9)$$

$$P_{bk} = \frac{2}{T} \int_0^T P(t) \sin k\omega t dt = \frac{2}{T} \oint P \sin k\theta d\theta \quad \cdots\cdots (10)$$

$$P_{mi} = \frac{T}{2V_s} \left( \sum_{k=1}^{\infty} P_{ak} V_{ak} + \sum_{k=1}^{\infty} P_{bk} V_{bk} \right) \quad \cdots\cdots (11)$$

$$P_{ak} = \frac{2}{N} \sum_{n=0}^{N-1} \{PF(n) \times C_k F(n)\} \quad \cdots\cdots (17)$$

$$P_{bk} = \frac{2}{N} \sum_{n=0}^{N-1} \{PF(n) \times S_k F(n)\} \quad \cdots\cdots (18)$$

$$V_{ak} = \frac{2}{N} \sum_{n=0}^{N-1} \{dV(n) \times C_k(n)\} \quad \cdots\cdots (19)$$

$$V_{bk} = \frac{2}{N} \sum_{n=0}^{N-1} \{dV(n) \times S_k(n)\} \quad \cdots\cdots (20)$$

$$P_{mi} = \frac{N}{2V_s} \left( \sum_{k=1}^{K} P_{ak} \times V_{ak} + \sum_{k=1}^{K} P_{bk} \times V_{bk} \right) \quad \cdots\cdots (21)$$

METHOD OF CALCULATING THE AMOUNT OF WORK DONE BY AN INTERNAL COMBUSTION ENGINE

BACKGROUND OF THE INVENTION

1. Field of the Invention

This invention relates to a method of calculating a work amount parameter, such as indicated mean effective pressure, which is indicative of the amount of work done by an internal combustion engine.

2. Description of the Related Art

Conventionally, a method of calculating indicated mean effective pressure has been disclosed e.g. in Japanese Laid-Open Patent Publication (Kokai) No. H11-182319. In this method, the indicated mean effective pressure is calculated as follows: In-cylinder pressure, i.e. pressure in a combustion chamber of an internal combustion engine, is detected by an in-cylinder pressure sensor of a piezoelectric element type which is mounted to a spark plug of the engine. Then, the indicated mean effective pressure is calculated by subtracting a value obtained by integrating the product of the detected in-cylinder pressure and the rate of change in volume of the combustion chamber (hereinafter simply referred to as "the volume change rate") as the piston of the engine is moved from a bottom dead center (BDC) position to a top dead center (TDC) position, from a value obtained by integrating the product as the piston is moved from the TDC position to the BDC position.

In the above conventional method, however, there can occur a large error in the calculated indicated mean effective pressure. More specifically, an in-cylinder pressure signal indicative of the detected pressure in the combustion chamber delivered from the in-cylinder pressure sensor, as described above, usually contains noises, and hence if in-cylinder pressure determined based on the in-cylinder pressure signal is used as it is for calculation of the indicated mean effective pressure, there is a fear that the calculated indicated mean effective pressure contains a large error due to influence of the noises.

To avoid the above inconvenience, it is envisaged, for example, to eliminate noises contained in the in-cylinder pressure data by filtering the in-cylinder pressure signal by a low-pass filter having a relatively low cutoff frequency. In this case, however, the low-pass filter generally has a characteristic that it delays the signal as it filters the same, and the delay is increased as the cutoff frequency of the low-pass filter is lower. This causes a relatively large phase delay of the filtered in-cylinder pressure with respect to the actual in-cylinder pressure. In this connection, since the indicated mean effective pressure is calculated based on the product of the in-cylinder pressure and the volume change rate, it is possible to regard the indicated mean effective pressure as a correlation coefficient between the in-cylinder pressure and the volume change rate. Further, a correlation coefficient between two data tends to be largely changed as phase deviation of one of the data from the phase of the other is larger. Therefore, due to the large phase delay which the in-cylinder pressure experiences as described above, the calculated indicated mean effective pressure comes to suffer from a significant error or difference from the proper value.

SUMMARY OF THE INVENTION

It is an object of the invention to provide a method of calculating the amount of work done by an internal combustion engine, which is capable of calculating a work amount parameter indicative of the amount of work done with accuracy while compensating for a phase delay of in-cylinder pressure data caused e.g. by a filtering process performed thereon.

To attain the above object, in a first aspect of the invention, there is provided a method of calculating a work amount parameter indicative of an amount of work done by an internal combustion engine having a combustion chamber, comprising the steps of:

detecting pressure in the combustion chamber to obtain in-cylinder pressure data indicative of the detected pressure;

obtaining volume data indicative of a state of change in volume of the combustion chamber;

subjecting the obtained volume data to a first predetermined filtering process; and calculating the work amount parameter based on the in-cylinder pressure data and the volume data subjected to the first filtering process.

With the configuration of the method according to the first aspect of present invention, pressure in the combustion chamber is detected to obtain in-cylinder-pressure data indicative of the obtained pressure, and volume data indicative of a state of change in the volume of the combustion chamber is subjected to a first predetermined filtering process. Then, a work amount parameter is calculated based on the volume data subjected to the first filtering process and the in-cylinder pressure data. Therefore, when a phase delay of the in-cylinder pressure data is generated e.g. due to a filtering process for eliminating noises from the in-cylinder pressure data or the response delay of a sensor that detects the in-cylinder pressure, the relative phase deviation between the in-cylinder pressure data and the volume data can be eliminated e.g. by imparting the same phase delay as the phase delay of the in-cylinder pressure data to the volume data through the first filtering process. This makes it possible to calculate the work amount parameter with accuracy while properly compensating for the phase delay of the in-cylinder pressure data.

To attain the above object, in a second aspect of present invention, there is provided a method of calculating a work amount parameter indicative of an amount of work done by an internal combustion engine having a combustion chamber, comprising the steps of:

detecting pressure in the combustion chamber to obtain in-cylinder pressure data indicative of the detected pressure;

subjecting a predetermined reference signal to a first predetermined filtering process; and calculating the work amount parameter based on the in-cylinder pressure data and the reference signal subjected to the first filtering process.

With the configuration of the method according to the second aspect of the present invention, in-cylinder pressure is-detected to obtain in-cylinder pressure data indicative of the detected pressure, and a predetermined reference signal is subjected to a first predetermined filtering process. Then, a work amount parameter is calculated based on the reference signal subjected to the first filtering process and the in-cylinder pressure data. Therefore, when a phase delay of the in-cylinder pressure data is generated e.g. by a filtering process performed thereon, the relative phase deviation between the in-cylinder pressure data and the reference signal can be eliminated e.g. by imparting the same phase delay as the phase delay of the in-cylinder pressure data to the reference signal through the first filtering process. This makes it possible to calculate the work amount parameter with accuracy while properly compensating for the phase delay of the in-cylinder pressure data.

Preferably, the method further comprises the steps of calculating a correlation coefficient between the in-cylinder pressure data and the reference signal based on the in-cylinder pressure data and the reference signal subjected to the first filtering process, and calculating the work amount parameter based on the calculated correlation coefficient.

With the configuration of the preferred embodiment, a correlation coefficient between the in-cylinder pressure data and the reference signal is calculated based on the in-cylinder pressure data and the reference signal subjected to the first filtering process, and the work amount parameter is calculated based on the calculated correlation coefficient. As a result, when a phase delay of the in-cylinder pressure data is generated, the relative phase deviation between the-in-cylinder pressure data and the reference signal can be eliminated e.g. by imparting the same phase delay as the phase delay of the in-cylinder pressure data to the reference signal through the first filtering process. This makes it possible to properly calculate the correlation coefficient while properly compensating for the phase delay of the in-cylinder pressure data, and hence the work amount parameter can be calculated with accuracy.

Preferably, the work amount-calculating method further comprises the step of sampling the in-cylinder pressure data at a first predetermined repetition period, subjecting the sampled in-cylinder pressure data to a second predetermined filtering process, sampling the in-cylinder pressure data subjected to the second filtering process at a second predetermined repetition period longer than the first repetition period, and using the in-cylinder pressure data sampled at the second predetermined repetition period for calculation of the work amount parameter.

With the configuration of the preferred embodiment, the in-cylinder pressure data sampled at a first predetermined repetition period is subjected to a second predetermined filtering process, and the in-cylinder pressure data subjected to the second filtering process is sampled at a second predetermined repetition period longer than the first repetition period. Then, the work amount parameter is calculated based on the in-cylinder pressure data sampled at the second repetition period, and the volume data or the reference signal, subjected to the first filtering process.

When the in-cylinder pressure data is sampled at a relatively long repetition period, aliasing sometimes occurs since various frequency components are contained in the in-cylinder pressure data. In this case, components of the sampled in-cylinder pressure data in a frequency range higher than a half of the sampling frequency are overlaid upon components in the lower frequency range, in a manner folded back toward the low frequency side. This results in the distortion of the sampled in-cylinder pressure data, and the work amount parameter calculated based on the distorted in-cylinder pressure data comes to contain a large error.

In contrast, according to the present invention, the in-cylinder pressure data is subjected to the second filtering process before it is sampled at the second repetition period. In this case, for example, the second filtering process is performed to eliminate components of the in-cylinder pressure data in a frequency range (hereinafter referred to as "the predetermined frequency range") not lower than the half of a frequency corresponding to the second repetition period, whereby the components in the predetermined frequency range are eliminated in advance before sampling of the in-cylinder pressure data. As a result, even if the in-cylinder pressure data is sampled at the second repetition period longer than the first repetition period, which can cause aliasing, it is possible to prevent aliasing from being caused by the sampling, thereby making it possible to prevent distortion of the in-cylinder pressure data caused by the aliasing.

Further, the phase delay of the in-cylinder pressure data caused by the second filtering process can be properly compensated for e.g. by performing the first filtering process using a filter having the same characteristic as that of a filter used in the second filtering process to thereby impart the same phase delay as the phase delay of the in-cylinder pressure data to the volume data or the reference signal to thereby eliminate the relative phase deviation between the in-cylinder pressure data and the volume data or the reference signal. This makes it possible to calculate the work amount parameter with accuracy while preventing aliasing and properly compensating for the phase delay of the in-cylinder pressure data. It should be noted that although in the second filtering process, the components of the in-cylinder pressure data in the frequency range not lower than the half of the frequency corresponding to the second repetition period are eliminated, as described above, components of the in-cylinder pressure data in a frequency range not lower than a predetermined frequency higher than the half of the frequency corresponding to the second repetition period may be eliminated so long as the result of calculation of the work amount parameter is not affected by aliasing. Furthermore, the in-cylinder pressure data sampled at the second repetition period longer than the first repetition period is used for calculation of the work amount parameter, which makes it possible to reduce the number of data items necessary for the calculation, which contributes to thinning of the data. Therefore, it is possible to decrease computation load of the work amount parameter.

The above and other objects, features, and advantages of the present invention will become more apparent from the following detailed description taken in conjunction with the accompanying drawings.

DETAILED DESCRIPTION OF PREFERRED EMBODIMENTS

Figure 1:
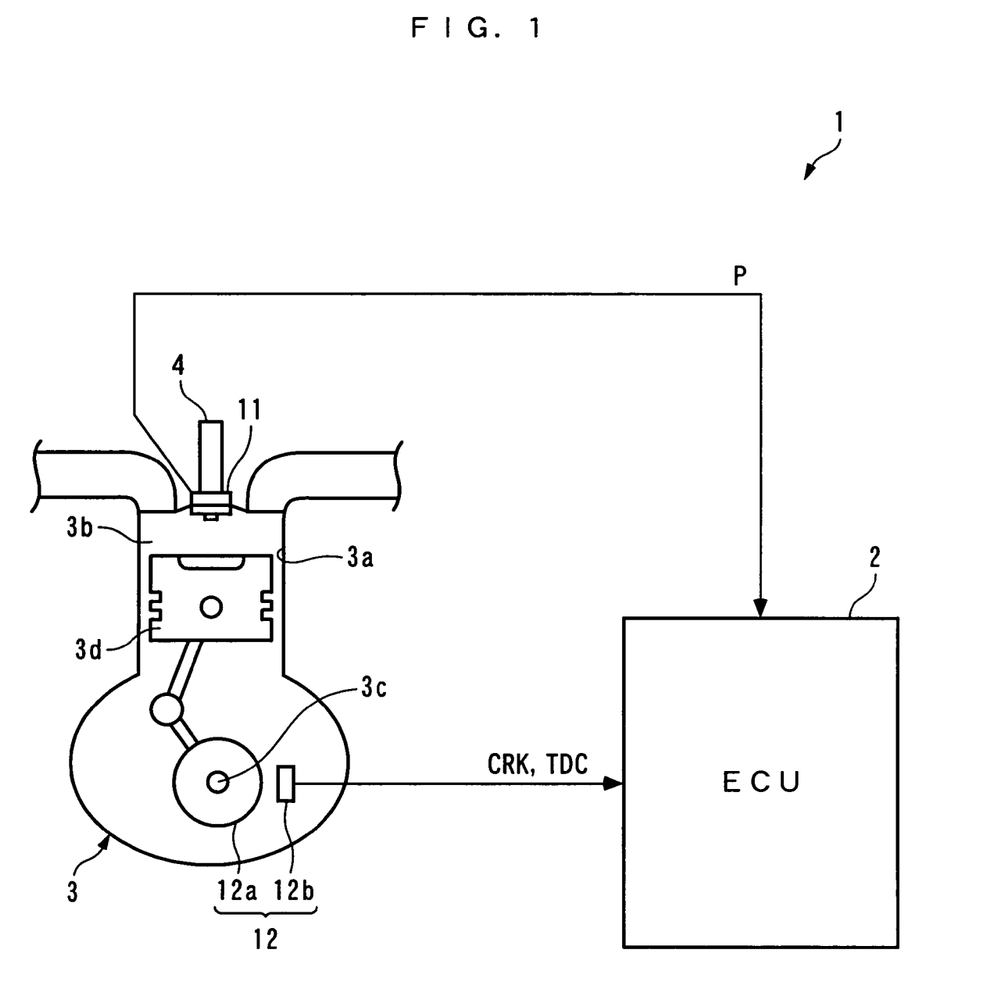
FIG. 1 is a schematic diagram of a calculation device, and an internal combustion engine to which the calculation device is applied.

The invention will now be described in detail with reference to the drawings showing a method of calculating an indicated mean effective pressure Pmi (work amount parameter) in an internal combustion engine, according to a first embodiment of the present invention. FIG. 1 is a schematic diagram of a calculation device 1 for calculating the indicated mean effective pressure $P_{mi}$ by the method according to the present invention, and an internal combustion engine (hereinafter referred to as "the engine") 3 to which the calculation device 1 is applied. The calculation device 1 includes an ECU 2, referred to hereinafter. The engine 3 is e.g. a four-stroke cycle gasoline engine, installed on a vehicle, not shown.

Spark plugs 4 are mounted through respective cylinder heads of cylinders 3a of the engine 3 in a manner facing a combustion chamber 3b. Each spark plug 4 has an in-cylinder pressure sensor 11 integrally mounted thereon. The in-cylinder pressure sensor 11 is e.g. of a piezoelectric element type, which detects pressure in the combustion chamber 3b based on displacement of a piezoelectric element (not shown) thereof occurring with a change in the pressure in the combustion chamber 3b (hereinafter referred to as "the in-cylinder pressure"), and delivers a signal P indicative of the detected in-cylinder pressure (hereinafter referred to as "the in-cylinder pressure data P") to the ECU 2.

A magnet rotor 12a is mounted on a crankshaft 3c of the engine 3. The magnet rotor 12a and an MRE pickup 12b form a crank angle sensor 12 that delivers a first CRK signal (at a second repetition period), and a second CRK signal (at a first repetition period) and a TDC signal, which are all pulse signals, to the ECU 2 in accordance with rotation of the crankshaft 3c. Each pulse of the first CRK signal and that of the second CRK signal are generated whenever the crankshaft 3c rotates through first and second predetermined angles (e.g. 15° and 1°), respectively. The TDC signal is delivered whenever the piston 3d of each cylinder 3a is at a predetermined crank angle position in the vicinity, of the top dead center (TDC) at the start of the suction stroke of the piston 3d.

The ECU 2 is implemented by a microcomputer comprised of an I/O interface, a CPU, a RAM, and a ROM. Outputs from the aforementioned sensors 11 and 12 are input to the CPU after the I/O interface performs A/D conversion and waveform shaping thereon. In response to these input signals, the CPU calculates the indicated mean effective pressure $P_{mi}$ in accordance with control programs read from the ROM.

Figure 2:
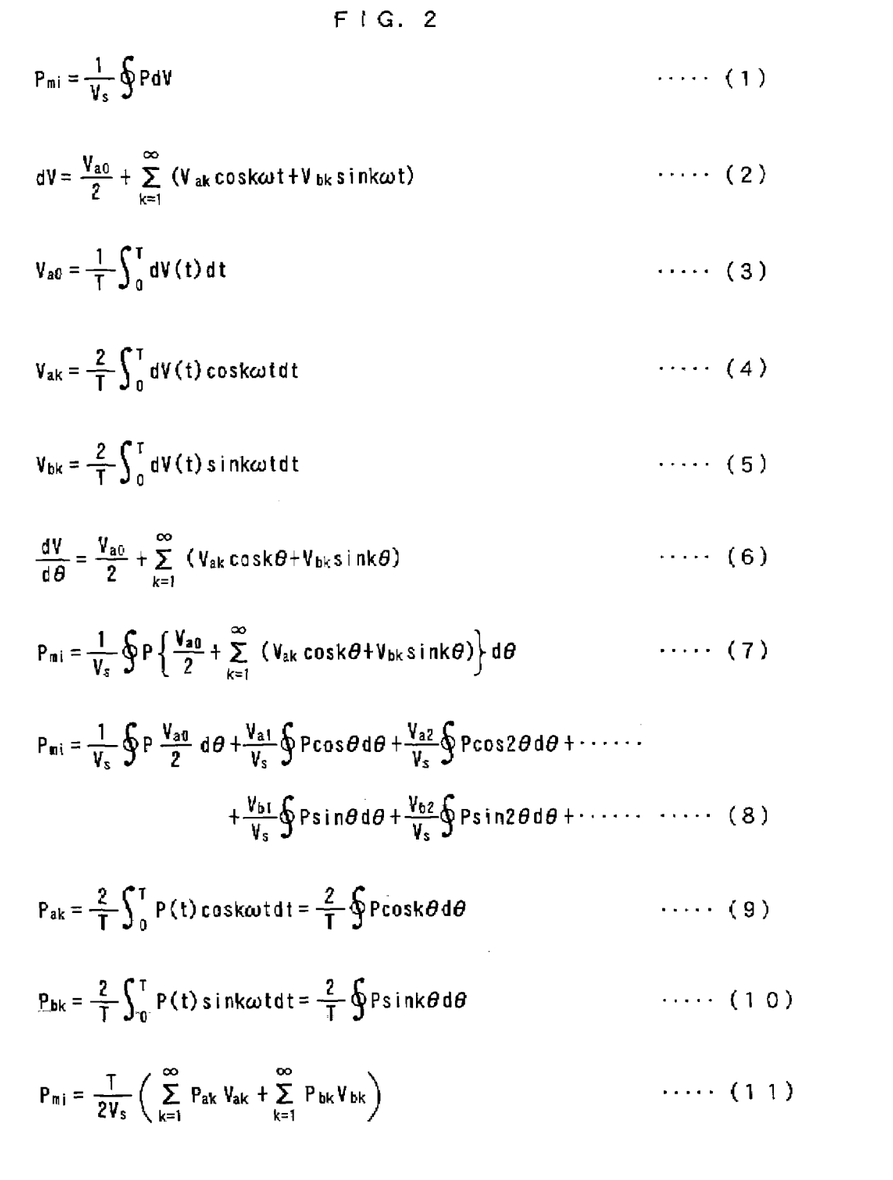
FIG. 2 is a diagram showing equations which are useful in explaining the concept of a method of calculating indicated mean effective pressure according to a first embodiment of the present invention.

Next, the concept of the method of calculating the indicated mean effective pressure $P_{mi}$ according to the present embodiment will be described with reference to FIG. 2. An equation (1) shown in FIG. 2 is a general equation for calculating the indicated mean effective pressure $P_{mi}$. In the equation, $V_s$ represents the piston displacement of the engine 3, and dV represents volume change rate data (volume data) indicative of the rate of change in volume of the combustion chamber 3b. As described above, the indicated mean effective pressure $P_{mi}$ is calculated by dividing a value obtained by one-turn integral of the product of the in-cylinder pressure data P and the rate of change in volume of the combustion chamber 3b, i.e. integrating the product over one combustion cycle, by the piston displacement $V_s$.

Further, the volume change rate data dV is represented by respective frequency components, as expressed by equations (2) to (5) in FIG. 2, using Fourier series expansion. In the equations (2) to (5), $V_{ao}$ represents the offset amount of amplitude of the volume change rate data dV, k the order of a frequency component of an integral multiple of the rotational frequency of the engine 3 (hereinafter referred to as "an engine speed integral order component"), included in the volume change rate data dV, and ω the angular velocity of the crankshaft 3c. Further, $V_{ak}$ represents a Fourier coefficient for an engine speed integral order component of the cosine wave components of the volume change rate data dV, $V_{bk}$ a Fourier coefficient for an engine speed integral order component of the sine wave components of the volume change rate data dV, and T the cycle or repetition period of the volume change rate data dV, which is equal to a time period required for one combustion cycle. Furthermore, an equation (6) is obtained by modifying the equation (2), and when equation (6) is substituted into the above equation (1), the indicated mean effective pressure $P_{mi}$ is expressed by an equation (7). In the equation (7), θ represents a crank angle. Further, when the equation (7) is expanded, the indicated mean effective pressure $P_{mi}$ is expressed by an equation (8).

Now, Fourier coefficients $P_{ak}$ and $P_{bk}$ (correlation coefficients between the in-cylinder pressure data P and the reference signals) for the engine speed integral order components of the cosine wave components and the sine wave components of the in-cylinder pressure data P, are expressed by equations (9) and (10), respectively, and the offset amount $V_{ao}$ of amplitude of the volume change rate data dV is approximately equal to a value of 0. When the above equation (8) is modified by taking this point into account, the indicated mean effective pressure $P_{mi}$ is expressed by an equation (11). In the equations (9) and (10), T represents the cycle or repetition period of the in-cylinder pressure data P, which is equal to a time period required for one combustion cycle. In the present embodiment, the indicated mean effective pressure $P_{mi}$ is calculated by the equation (11). As is apparent from the equation (11), the indicated mean effective pressure $P_{mi}$ is calculated based on the Fourier coefficients $P_{ak}$ and $P_{bk}$ of the in-cylinder pressure data P and the Fourier coefficients $V_{ak}$ and $V_{bk}$ of the volume change rate data dV.

Figure 3A:
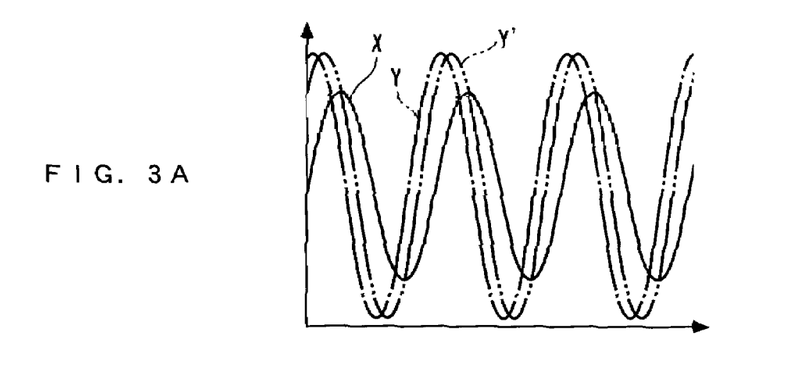
FIGS. 3A and 3B are diagrams useful in explaining the concept of the method of calculating the indicated mean effective pressure according to the first embodiment.
Figure 3B:
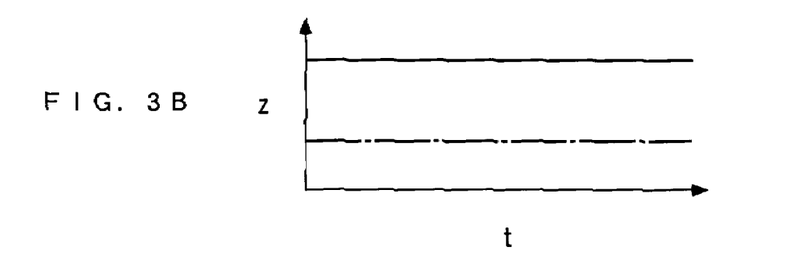

In the above-described equations (9) and (10), the cosine wave and the sine wave used in calculation of the Fourier coefficients $P_{ak}$ and $P_{bk}$ of the in-cylinder pressure data P are generically referred to as "reference waves X". Further, as shown in FIGS. 3A and 3B, a correlation coefficient Z between a reference wave X and a predetermined signal Y, that is, a value expressing the average of the product of the reference wave X and the signal Y obtained in the same timing, over a predetermined time period, has the following characteristic: When there has not occurred any phase delay in the signal Y, or any relative phase deviation between the reference wave X and the signal Y, the correlation coefficient Z becomes equal to a value indicated by a solid line in FIG. 3B. In contrast, when the signal Y is changed into a signal Y' having a phase delay caused therein, thereby causing a relative phase deviation between the reference wave X and the signal Y', the correlation coefficient Z becomes equal to a value indicated by a one-dot chain line in FIG. 3B, which is different from the corresponding value indicated by the solid line.

Furthermore, it is possible to regard the Fourier coefficients $P_{ak}$ and $P_{bk}$ as correlation coefficients between the in-cylinder pressure data P and reference waves X, as is clear from the fact that they are calculated by the aforementioned equations (9) and (10). Therefore, e.g. when a phase delay of the in-cylinder pressure data P is generated due to a filtering process performed for eliminating noises on the in-cylinder pressure data P, thereby causing a relative phase deviation between the in-cylinder pressure data P and the reference waves X, the Fourier coefficients $P_{ak}$ and $P_{bk}$ are changed. This results in an error in the indicated mean effective pressure $P_{mi}$ calculated based on the Fourier coefficients $P_{ak}$ and $P_{bk}$.

Figure 4A:
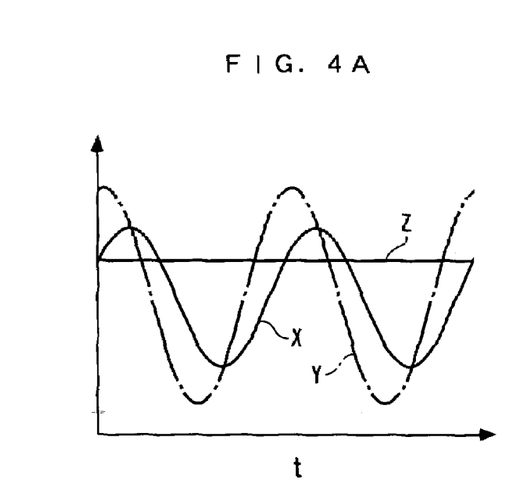
FIGS. 4A and 4B are other diagrams useful in explaining the concept of the method of calculating the indicated mean effective pressure according to the first embodiment.
Figure 4B:
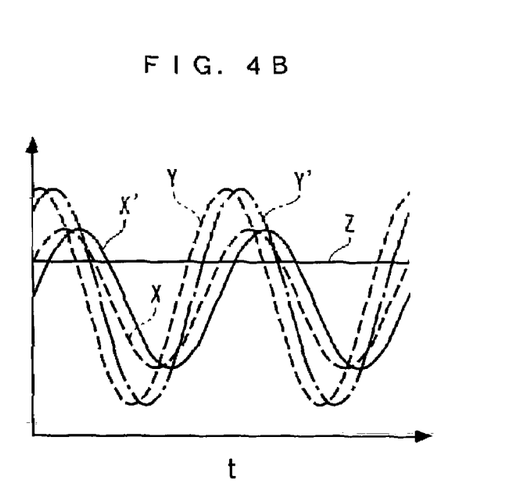

Further, as shown in FIGS. 4A and 4B, the correlation coefficient Z has a characteristic that when a reference wave X and the signal Y are caused to have the same phase delay whereby they are changed into a reference wave X' and the signal Y', respectively (FIG. 4B), the correlation coefficient Z becomes equal to a value to be assumed when the reference wave X and the signal Y has no phase delay. By paying attention to this point, in the present embodiment, the reference waves X are filtered using respective filters having the same characteristic as that of a filter for filtering the in-cylinder pressure data P, and the Fourier coefficients $P_{ak}$ and $P_{bk}$ are calculated based on the filtered in-cylinder pressure data P and the reference wave X. Then the indicated mean effective pressure $P_{mi}$ is calculated based on the calculated Fourier coefficients $P_{ak}$ and $P_{bk}$. Thus, the same phase delay produced in the filtered in-cylinder pressure data P is imparted to the reference waves X, whereby the relative phase deviation between the in-cylinder pressure data P and the reference waves X can be eliminated when a phase delay is produced in the in-cylinder pressure data P by filtering the same. This makes it possible to calculate the indicated mean effective pressure $P_{mi}$ with accuracy while properly compensating for the phase delay of the in-cylinder pressure data P.

Figure 5:
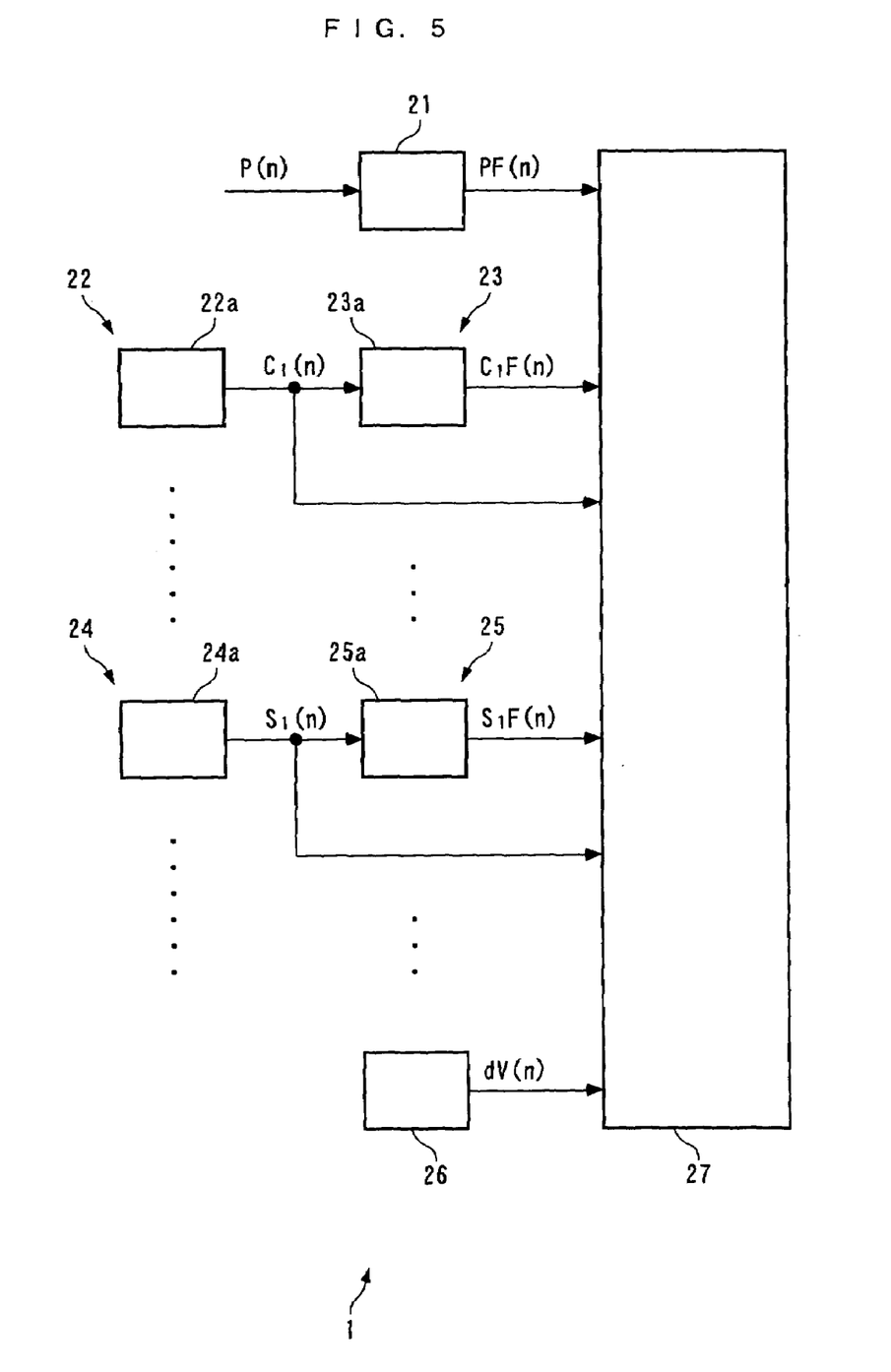
FIG. 5 is a schematic block diagram of the calculation device according to the first embodiment.

Referring to FIG. 5, the calculation device 1 for performing the aforementioned calculation is comprised of an in-cylinder pressure filter 21, a cosine wave-generating section 22, a cosine wave filter 23, a sine wave-generating section 24, a sine wave filter 25, a volume change rate data generating section 26, and an indicated mean effective pressure-calculating section 27.

Figure 6A:
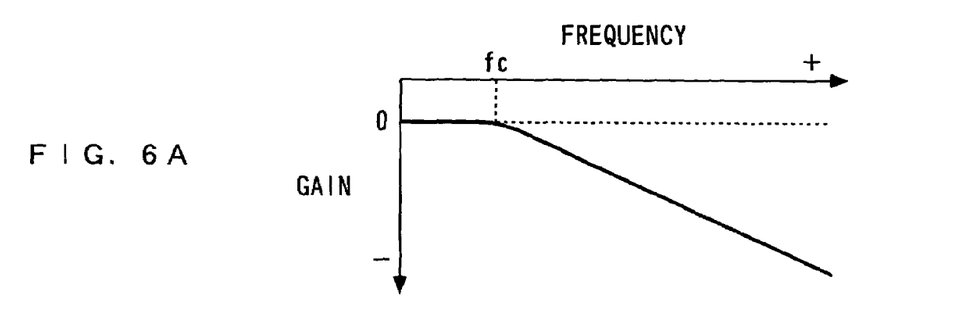
FIG. 6A is a diagram useful in explaining a gain characteristic of an in-cylinder pressure filter.
Figure 6B:
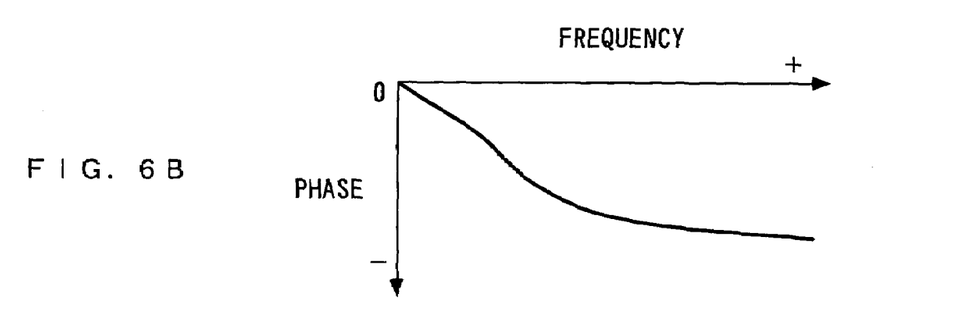
FIG. 6B is a diagram useful in explaining a phase characteristic of the in-cylinder pressure filter.

The in-cylinder pressure filter 21 is a low-pass filter, for example, and has a gain characteristic and a phase characteristic shown in FIGS. 6A and 6B, respectively. Its gain is set such that it becomes equal to a value of 0 dB when the frequency of an input signal is lower than a predetermined cutoff frequency fc. Further, the in-cylinder pressure filter 21 generates an in-cylinder pressure filtered value PF(n) by filtering in-cylinder pressure data P(n) so as to cause components thereof in a frequency range lower than the cutoff frequency fc to pass therethrough, and outputs the in-cylinder pressure filtered value PF(n) to the indicated mean effective pressure-calculating section 27. By performing this filtering, noises contained in the in-cylinder pressure data P(n) are sufficiently eliminated. More specifically, the in-cylinder pressure filtered value PF(n) is calculated (generated) by the following equation (12):

$$PF(n) = a1 \times PF(n-1) + a2 \times PF(n-2) + \ldots + \\ ap \times PF(n-p) + b0 \times P(n) + b1 \times P(n-1) + \ldots + bq \times P(n-q) \quad (12)$$

In the equation (12), a1, a2, . . . ap, b0, b1, . . . and bq represent predetermined filter coefficients. It should be noted that the symbol n represents a sampling number indicative of a discretized time, and each portion with the sampling number n represents discrete data sampled whenever the first CRK signal is inputted. Further, the sampling number n is reset to a value of 0 whenever the TDC signal is inputted, and incremented whenever the first CRK signal is inputted. This means that the sampling number n is varied from a value of 0 to a maximum value of 47 over one combustion cycle.

The cosine wave-generating section 22 is comprised of a first order cosine wave-generating section 22a to a K-th order cosine wave-generating esection (not shown) (K is a predetermined value) which generate cosine waves $C_k(n)$ (reference signals) of the above-described reference waves X for respective orders K. It should be noted that in the present embodiment, the predetermined value K, i.e. the number of the cosine wave-generating sections is set according to the number of orders k necessary for calculation of the indicated mean effective pressure $P_{mi}$. For clarity purposes, only the first order cosine wave-generating section 22a is shown in FIG. 5. The cosine wave $C_k(n)$ is calculated (generated) by the following equation (13):

$$C_k(n) = \cos k \times (2\pi/N) \times n \quad (13)$$

In the equation (13), the symbol N represents the number of times of input of the first CRK signal during one combustion cycle, that is, the number of times of sampling of data, which is equal to 720/15=48. The generated cosine wave $C_k(n)$ is outputted to the cosine wave filter 23 and the indicated mean effective pressure-calculating section 27.

The cosine wave filter 23 is comprised of a plurality of low-pass filters the number of which is equal to the number of the cosine wave-generating sections 22, and the low-pass filters have the same characteristic as that of the in-cylinder pressure filter 21 described above. Further, the cosine wave filter 23 generates a cosine wave filtered value $C_kF(n)$ (reference signal subjected to a first filtering process) by filtering the cosine wave $C_k(n)$ such that components thereof in the frequency range lower than the cutoff frequency fc are allowed to pass therethrough, and outputs the cosine wave filtered value $C_kF(n)$ to the indicated mean effective pressure-calculating section 27. For clarity purposes, only a first order cosine wave filter 23a is shown in FIG. 5. The cosine wave filtered value $C_kF(n)$ is calculated (generated) by the following equation (14):

$$C_kF(n) = \\ a1 \times C_kF(n-1) + a2 \times C_kF(n-2) + \ldots + ap \times C_kF(n-p) + \\ b0 \times C_k(n) + b1 \times C_k(n-1) + \ldots + bq \times C_k(n-q) \quad (14)$$

The sine wave-generating section 24 is comprised of a first order sine wave-generating section 24a to a K-th order sine wave-generating section (not shown) (K is a predetermined value) which generate sine waves $S_k(n)$ (reference signals) of the above-described reference waves X for respective orders K. It should be noted that the number of the first order sine wave-generating section 24a to the K-th order sine wave-generating section is equal to the number of the first order cosine wave-generating section 22a to the K-th order cosine wave-generating section. For clarity purposes, only a first order sine wave-generating section 24a is shown in FIG. 5. The sine wave $S_k(n)$ is calculated (generated) by the following equation (15):

$$S_k(n) = \sin k \times (2\pi/N) \times n \quad (15)$$

The generated sine wave $S_k(n)$ is outputted to the sine wave filter 25 and the indicated mean effective pressure-calculating section 27. The sine wave filter 25 is comprised of a plurality of low-pass filters the number of which is equal to the number of the sine wave-generating sections 24, and the low-pass filters have the same characteristic as that of the in-cylinder pressure filter 21, similarly to the cosine wave filter 23. Further, the sine wave filter 25 generates a sine wave filtered value $S_kF(n)$ (reference signal subjected to the first filtering process) by filtering the sine wave $S_k(n)$ such that components thereof in the frequency range lower than the cutoff frequency fc are allowed to pass therethrough, and outputs the sine wave filtered value $S_kF(n)$ to the indicated mean effective pressure-calculating section 27. For clarity purposes, only a first sine wave filter 25a is shown in FIG. 5. The sine wave filtered value $S_kF(n)$ is calculated (generated) by the following equation (16):

$$S_kF(n) = a1 \times S_kF(n-1) + a2 \times S_kF(n-2) + \ldots + ap \times S_kF(n-p) + \quad (16)$$
$$b0 \times S_k(n) + b1 \times S_k(n-1) + \ldots + bq \times S_k(n-q)$$

Figure 7:
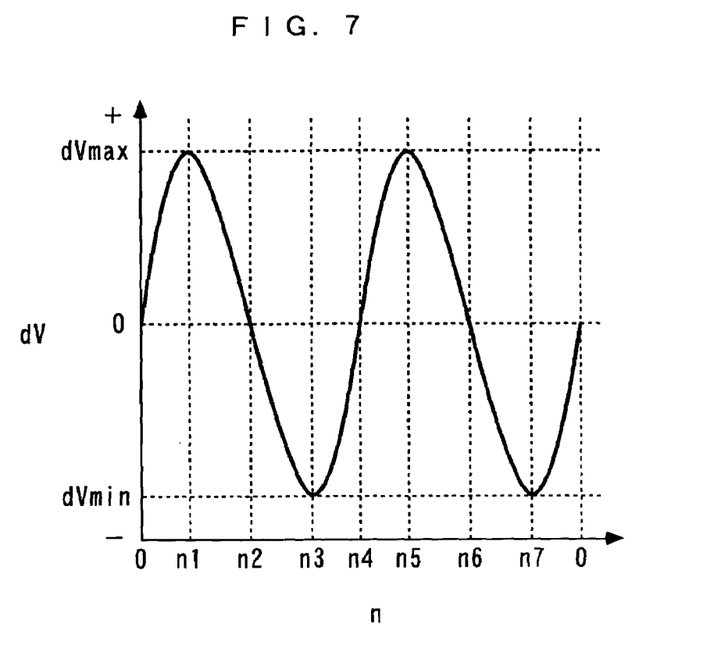
FIG. 7 is a diagram showing an example of a dV table.

The volume change rate data-generating section 26 generates volume change rate data $dV(n)$ by searching a dV table shown in FIG. 7 according to the sampling number n, and outputs the volume change rate data $dV(n)$ to the indicated mean effective pressure-calculating section 27. The dV table is prepared by arranging, in a tabular form, values of an actual rate of change in volume of the combustion chamber 3b dependent on the motion of the piston 3d. To this end, the volume change rate data $dV(n)$ is configured to have a generally sine waveform. More specifically, in the dV table, the volume change rate data $dV(n)$ is set to a value of 0 when the sampling number n is equal to a value of 0 (when the TDC signal is inputted) and it is set to a maximum value dVmax when the sampling number n is equal to a value of n1 corresponding to an approximately intermediate position between the TDC position and a bottom dead center (BDC) position next to the TDC position. Further, it is set to a value of 0 when the sampling number n is equal to a value of n2 corresponding to the BDC position. Further, it is set to a minimum value dVmin, which is a negative value, when the sampling number n is equal to a value of n3 corresponding to an approximately intermediate position between the BDC position and a TDC position (at the start of the expansion stroke of the piston 3d) next to the BDC position, and when the sampling number n is equal to a value of n4 corresponding to this TDC position, it is set to a value of 0. Furthermore, when the sampling number n varies from a value of n4 corresponding to the above TDC position to a value of 0 corresponding to a position where the next TDC signal is inputted, the volume change rate data $dV(n)$ is set similarly to the above case where the sampling number n varies from a value of 0 to a value of n4. Thus, it is possible to obtain a volume change rate data $dV(n)$ matching an actual rate of change in volume of the combustion chamber 3b.

The indicated mean effective pressure-calculating section 27 calculates the indicated mean effective pressure $P_{mi}$ based on the in-cylinder pressure filtered value $PF(n)$, the cosine wave $C_k(n)$, the cosine wave filtered value $C_kF(n)$, the sine wave $S_k(n)$, the sine wave filtered value $S_kF(n)$, and the volume change rate data $dV(n)$. More specifically, first, the indicated mean effective pressure-calculating section 27 calculates the Fourier coefficients $P_{ak}$ and $P_{bk}$ of the in-cylinder pressure data P based on the in-cylinder pressure filtered value $PF(n)$, the cosine wave filtered value $C_kF(n)$, and the sine wave filtered value $S_kF(n)$ by equations (17) and (18) in FIG. 8. The equations (17) and (18) are obtained by converting the aforementioned equations (9) and (10), which are equations of a continuous-time system, into equations of a discrete-time system. It should be noted that only the results of multiplications of the same frequency components of the in-cylinder pressure filtered value $PF(n)$, the cosine wave filtered value $C_kF(n)$, and the sine wave filtered value $S_kF(n)$ remain in the results of the calculations by the equations (17) and (18), and the products of frequency components thereof different from each other have no influence on the results of the calculations. This is obvious from the fact that when the in-cylinder pressure data P is Fourier-expanded in the equations (9) and (10), results of calculations other than the results of multiplications of the same frequency components become equal to 0 due to the orthogonality of the trigonometric functions.

Figure 8:
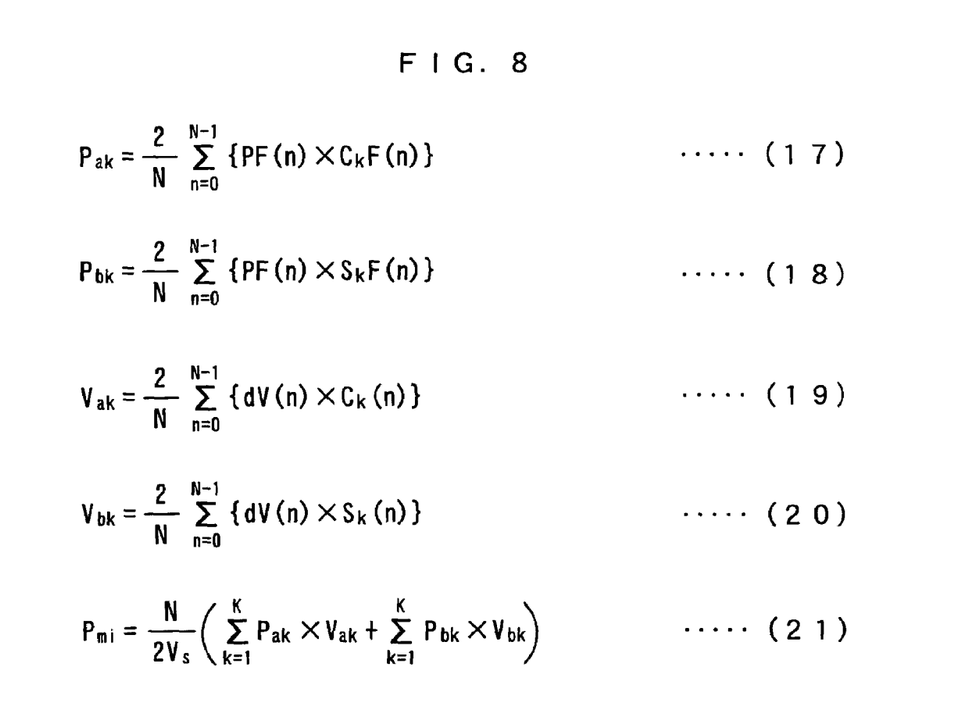
FIG. 8 is a diagram showing equations used for calculation of Fourier coefficients and the indicated mean effective pressure.

Then, the Fourier coefficients $V_{ak}$ and $V_{bk}$ of the volume change rate data dV are calculated using equations (19) and (20) in FIG. 8, based on the volume change rate-data $dV(n)$, the cosine wave $C_k(n)$, and the sine wave $S_k(n)$. The equations (19) and (20) are obtained by converting the aforementioned equations (4) and (5), which are equations of the continuous-time system, into equations of the discrete-time system. Similarly to the case of calculations of the Fourier coefficients $P_{ak}$ and $P_{bk}$ of the in-cylinder pressure data P, in the results of calculations of the Fourier coefficients $V_{ak}$ and $V_{bk}$ in this case, there remain only the results of multiplications of the same frequency components of the volume change rate data $dV(n)$, the cosine wave $C_k(n)$, and the sine wave $S_k(n)$. Subsequently, the indicated mean effective pressure $P_{mi}$ is calculated by an equation (21) in FIG. 8, using the Fourier coefficients $P_{ak}$ and $P_{bk}$ of the in-cylinder pressure data P and the Fourier coefficients $V_{ak}$ and $V_{bk}$ of the volume change rate data dV. This equation is obtained by converting the aforementioned equation (11), which is of the continuous-time system, into an equation of the discrete-time system.

Figure 9A:
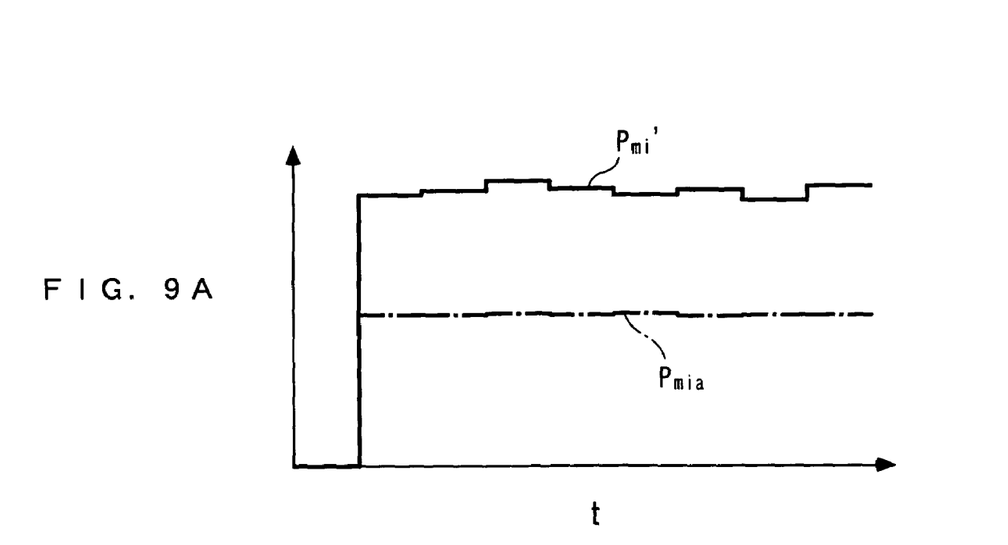
FIG. 9A is a diagram showing the indicated mean effective pressure calculated using a cosine wave and a sine wave not subjected to the filtering process together with actual indicated mean effective pressure.
Figure 9B:
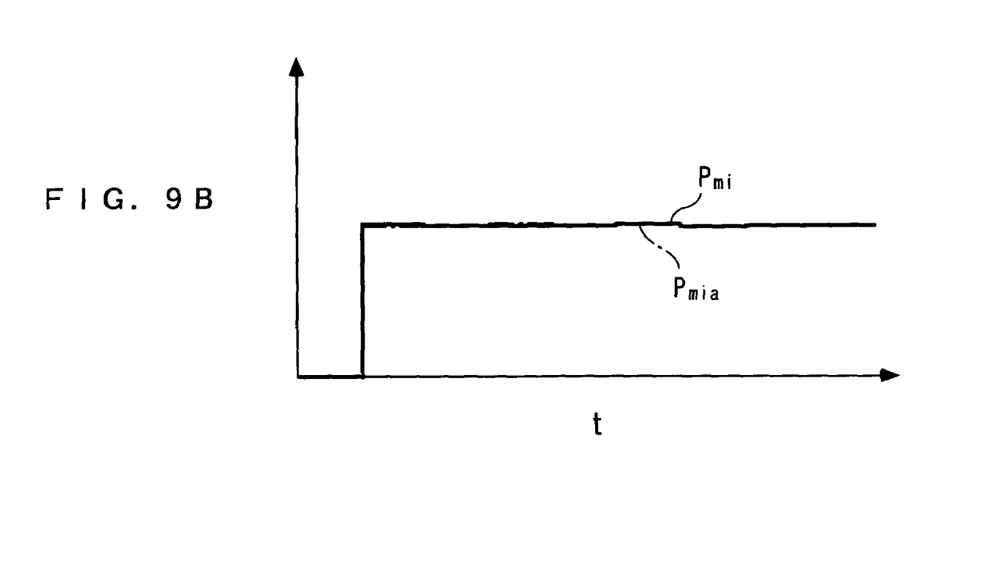
FIG. 9B is a diagram showing the indicated mean effective pressure calculated by the calculation device together with the actual indicated mean effective pressure.

FIGS. 9A and 9B show the results of the above-described calculations of the indicated mean effective pressure $P_{mi}$ together with a comparative example. In the comparative example shown in FIG. 9A, an indicated mean effective pressure $P_{mi}'$ is calculated using the cosine wave $C_k$ and the sine wave $S_k$ as it is without filtering them. According to the result of the calculation, the calculated indicated mean effective pressure $P_{mi}'$ has a much larger value than that of the actual indicated mean effective pressure $P_{mi}$ due to a phase deviation of the in-cylinder pressure filtered value PF from the cosine wave $C_k$ or the sine wave $S_k$, which causes a very large error.

In contrast, as shown in FIG. 9B, the indicated mean effective pressure $P_{mi}$ calculated by the calculation device 1 described above approximately matches the actual indicated mean effective pressure $P_{mi}$, and almost no error is recognized.

As described above, according to the present embodiment, the in-cylinder pressure filtered value PF is generated by filtering the in-cylinder pressure data P by the in-cylinder pressure filter 21, and the cosine wave filtered value $C_kF$ and the sine wave filtered value $S_kF$ are generated by filtering the cosine wave $C_k$ and the sine wave $S_k$ by the respective cosine wave and sine wave filters 23 and 25 having the same characteristic as that of the in-cylinder pressure filter 21. Then, the Fourier coefficients $P_{ak}$ and $P_{bk}$ of the in-cylinder pressure data P are calculated based on the in-cylinder pressure filtered value PF and the cosine wave and sine wave filtered values $C_kF$ and $S_kF$, and the indicated mean effective pressure $P_{mi}$ is calculated based on the calculated Fourier coefficients $P_{ak}$ and $P_{bk}$. This filtering process makes it possible to sufficiently eliminate noises from the in-cylinder pressure data P without causing the relative phase deviation of the in-cylinder pressure filtered value PF from the cosine wave and sine wave filtered values $C_kF$ and $S_kF$. Therefore, it is possible to properly calculate the Fourier coefficients $P_{ak}$ and $P_bk$ while eliminating influence of noises and compensating for a phase delay of the in-cylinder pressure filtered value PF. This makes it possible to calculate the indicated mean effective pressure $P_{mi}$ with accuracy.

It should be noted that the in-cylinder pressure filter 21, and the cosine wave and sine wave filters 23 and 25 may be formed by filters different from each other according to the order k. For example, when the order k is low, a filter having a low cutoff frequency is employed, whereas when the order k is high, a filter or a bandpass filter having a higher cutoff frequency is employed. Particularly, in the present embodiment, as described hereinabove, only the results of multiplications of the same frequency components of the in-cylinder pressure filtered value PF(n), the cosine wave and sine wave filtered value $C_kF(n)$ and $S_kF(n)$ remain in the results of the calculations by the equations (17) and (18), so that if the filters 21, 23 and 25 are constructed as described above, only components of a required band can be extracted from the in-cylinder pressure data P, whereby it is possible to eliminate noises positively and sufficiently, thereby making it possible to calculate the indicated mean effective pressure $P_{mi}$ with higher accuracy. Further, in this case, since the in-cylinder pressure filter 21, and the cosine wave and sine wave filters 23 and 25 are formed by filters having the same characteristic for each order k, it is possible to calculate the indicated mean effective pressure $P_{mi}$ with still higher accuracy while positively eliminating influence of noises, and compensating for the phase delay of the in-cylinder pressure filtered value PF.

Further, although in the present embodiment, the number of the cosine wave-generating sections 22 and the number of the sine wave-generating sections 24 are set to be equal to each other, they may be different from each other. Furthermore, although in the present embodiment, the Fourier coefficients $V_{ak}$ and $V_{bk}$ of the volume change rate data dV are determined by calculation, they may be empirically determined e.g. by experiment in advance, and set as values in a table, for being determined or selected by searching the table, instead of executing the calculation.

Further, in the aforementioned equation (21), the number of orders k of the Fourier coefficients $P_{ak}$, $P_{bk}$, $V_{ak}$ and $V_{bk}$ used for calculation of the indicated mean effective pressure $P_{mi}$ can be set as desired. For example, as is clear from the above-described dV table, the volume change rate data dV is formed almost only by the sin components, and hence the Fourier coefficients $P_{ak}$, $P_{bk}$, $V_{ak}$ and $V_{bk}$ of high-order components become approximately equal to a value of 0. Therefore, even when the Fourier coefficients $P_{ak}$, $P_{bk}$, $V_{ak}$ and $V_{bk}$ of components up to k=2, i.e. the second order, are employed, the indicated mean effective pressure $P_{mi}$ can be calculated with accuracy. Furthermore, in this case, the indicated mean effective pressure $P_{mi}$ may be calculated using only first-order and second-order Fourier coefficients Pb1 and Pb2 of the sine wave components of the in-cylinder pressure data P.

Next, a method of calculating the indicated mean effective pressure $P_{mi}$ according to a second embodiment of the present invention will be described. The present embodiment is distinguished from the above-described first embodiment in that the indicated mean effective pressure $P_{mi}$ is calculated by the aforementioned equation (1) without using the Fourier coefficients $P_{ak}$, $P_{bk}$, $V_{ak}$, and $V_{bk}$. First, a description will be given of the concept of the calculation method according to the present embodiment.

As described hereinbefore, a correlation coefficient $\gamma$ between two certain signals $\alpha$ and $\beta$ indicates an average value of the product of the signal $\alpha$ and the signal $\beta$ obtained in the same timing, over a predetermined time period, and is expressed by the following equation (22):

$$\gamma = \frac{1}{M}\sum_{m=0}^{M}\{\alpha(m)\times\beta(m)\} \quad (22)$$

wherein m represents a sampling number, and M the number of sampled data.

On the other hand, when the equation (1) is modified using the aforementioned sampling number n and the symbol N, there is obtained the following equation (23):

$$P_{mi} = \frac{1}{V_S}\sum_{n=0}^{N-1} P(n)\{V(n)-V(n-1)\} \quad (23)$$

wherein V represents volume data indicative of the volume of the combustion chamber 3b.

Since $\{V(n)-V(n-1)\}$ in the equation (23) is equal to the volume change rate data dV(n), the equation (23) can be changed into the following equation (24):

$$P_{mi} = \frac{1}{V_S}\sum_{n=0}^{N-1} P(n)dV(n) \quad (24)$$

Figure 10:
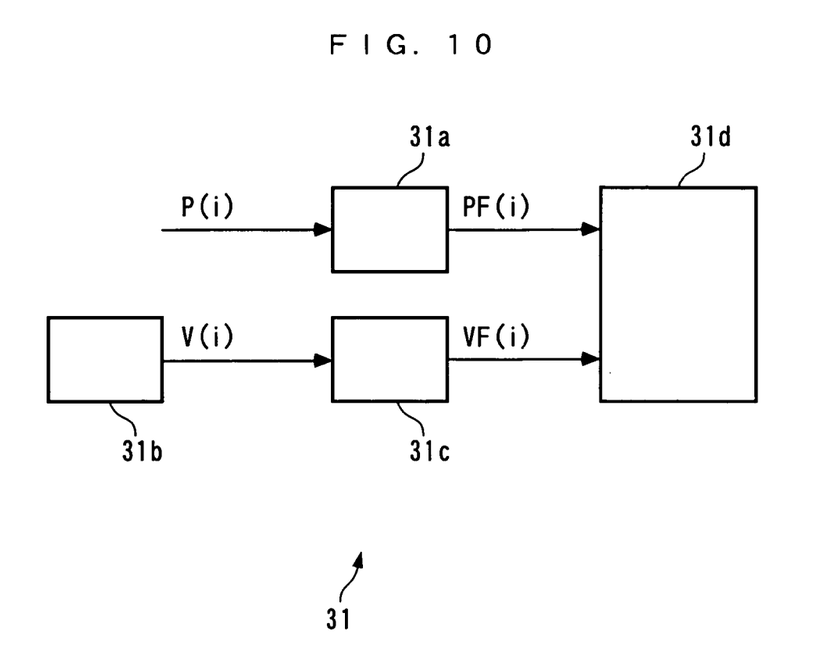
FIG. 10 is a schematic block diagram of a calculation device according to a second embodiment of the present invention.

As is apparent from the above equation (24), the equation for calculating the indicated mean effective pressure $P_{mi}$ can be regarded as an equation for calculating a correlation coefficient between the in-cylinder pressure data P and the volume change rate data dV. Therefore, by applying the concept of the calculation method according to the first embodiment to a calculation device 31 according to the present embodiment, the volume data V is filtered using a filter having the same characteristic as that of a filter for filtering the in-cylinder pressure data P, and the indicated mean effective pressure $P_{mi}$ is calculated by the above equation (23) using the filtered in-cylinder pressure data P and the filtered volume data V. This makes it possible to eliminate the relative phase deviation of the in-cylinder pressure data P from the volume data V by imparting the same phase delay as the phase delay of the in-cylinder pressure data P to the volume data V, and hence to calculate the indicated mean effective pressure $P_{mi}$ with accuracy while properly compensating for the phase delay of the in-cylinder pressure data P.

Next, the calculation device 31 for performing the aforementioned calculation will be described with reference to FIG. 10. The calculation device 31 is comprised of an in-cylinder pressure filter 31a, a volume data-generating section 31b, a volume data filter 31c, and an indicated mean effective pressure-calculating section 31d.

The in-cylinder pressure filter 31a is formed e.g. by a low-pass filter. For the purpose of eliminating noises in the in-cylinder pressure data P(i), the in-cylinder pressure filter 31a filters in-cylinder pressure data P(i) such that components of the data P(i) in a frequency range lower than a predetermined cutoff frequency fc' are allowed to pass therethrough, to thereby generate an in-cylinder pressure filtered value PF(i), and outputs the in-cylinder pressure filtered value PF(i) to the indicated mean effective pressure-calculating section 31d. More specifically, the in-cylinder pressure filtered value PF(i) is calculated (generated) by the following equation (25):

$$PF(i) = c1 \times PF(i-1) + c2 \times PF(i-2) + \ldots + cp \times PF(i-p) + d0 \times P(i) + d1 \times P(i-1) + \ldots + dq \times P(i-q) \quad (25)$$

wherein c1, c2, ... cp, d0, d1 ... , and dq represent predetermined filter coefficients. Further, the symbol i represents a sampling number indicative of a discretized time, and each portion with the sampling number i represents discrete data sampled whenever the second CRK signal is inputted, that is, whenever the crankshaft 3c rotates through 1°. Furthermore, the sampling number i is reset to a value of 0 whenever the TDC signal is inputted, and incremented whenever the second CRK signal is inputted. This means that the sampling number i is varied from a value of 0 to a maximum value of 719, over one combustion cycle.

Figure 11:
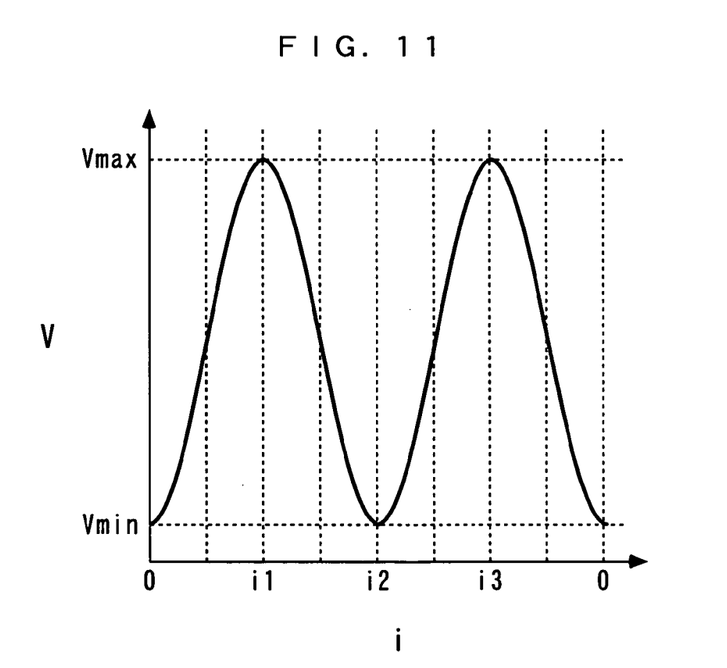
FIG. 11 is a diagram showing an example of a V table.

The volume data-generating section 31b generates volume data V(i) by searching a V table shown in FIG. 11 according to the sampling number i, and outputs the volume data V(i) to the volume data filter 31c. The V table is prepared by arranging, in a tabular form, values of the actual volume of the combustion chamber 3b dependent on the motion of the piston 3d. To this end, the volume data V(i) is set to have a generally cosine waveform. More specifically, in the V table, the volume data V(i) is set to a minimum value Vmin when the sampling number i is equal to a value of 0 (when the TDC signal is inputted) and it is set to a maximum value Vmax when the sampling number i is equal to a value of i1 corresponding to a BDC position next to the TDC position. Further, the volume data V(i) is set to the minimum value Vmin when the sampling number i is equal to a value of i2 corresponding to a TDC position (at the start of the expansion stroke of the piston 3d) next to the BDC position. Further, when the sampling number i varies from a value of i2 corresponding to the TDC position to a value of 0 corresponding to a position where the next TDC signal is inputted, the volume data V(i) is set similarly to the case where the sampling number i varies from a value of 0 to a value of i2. Furthermore, the minimum value Vmin is set to the volume of the combustion chamber 3b obtained when the piston 3d is at the TDC position, and the maximum value Vmax is set to the volume of the combustion chamber 3b obtained when the piston 3d is at the BDC position. The above configuration makes it possible to obtain the volume data V(i) matching the actual volume of the combustion chamber 3b.

The volume data filter 31c is a low-pass filter having the same characteristic as that of the in-cylinder pressure filter 31a described above. Further, the volume data filter 31c generates a volume data filtered value VF(i) (volume data subjected to the first filtering process) by filtering the input volume data V(i) such that components thereof in a frequency range lower than the cutoff frequency fc' are allowed to pass therethrough, and outputs the volume data filtered value VF(i) to the indicated mean effective pressure-calculating section 31d. More specifically, the volume data filtered value VF(i) is calculated (generated) by the following equation (26):

$$VF(i) = c1 \times VF(i-1) + c2 \times VF(i-2) + \ldots + cp \times VF(i-p) + d0 \times V(i) + d1 \times V(i-1) + \ldots + dq \times V(i-q) \quad (26)$$

The indicated mean effective pressure-calculating section 31d calculates the indicated mean effective pressure $P_{mi}$ using the input in-cylinder pressure filtered value PF(i) and volume data filtered value VF(i), by the following equation (27):

$$P_{mi} = \frac{1}{V_S} \sum_{i=0}^{I-1} PF(i)\{VF(i) - VF(i-1)\} \quad (27)$$

wherein the symbol I represents the number of times of input of the second CRK signal over one combustion cycle, that is, the number of times of sampling of data, which is equal to 720.

As described hereinabove, according to the present embodiment, the in-cylinder pressure filtered value PF is generated by filtering the in-cylinder pressure data P by the in-cylinder pressure filter 31a, and the volume data filtered value VF is generated by filtering the volume data V by the volume data filter 31c having the same characteristic as that of the in-cylinder pressure filter 31a. Then, the indicated mean effective pressure $P_{mi}$ is calculated based on the in-cylinder pressure filtered value PF and the volume data filtered value VF. This filtering process makes it possible to sufficiently eliminate noises from the in-cylinder pressure data P without causing the relative phase deviation between the in-cylinder a P and the volume data V. Therefore, similarly to the above-described first embodiment, it is possible to calculate the indicated mean effective pressure $P_{mi}$ with accuracy while eliminating influence of noises and compensating for the phase delay of the in-cylinder pressure filtered value PF.

It should be noted that although in the present embodiment, the volume data V is filtered, the volume change rate data dV determined based on the volume data V may be filtered instead of filtering the volume data V. In this case as well, it is possible to obtain the same advantageous effects as provided by the present embodiment.

Figure 12:
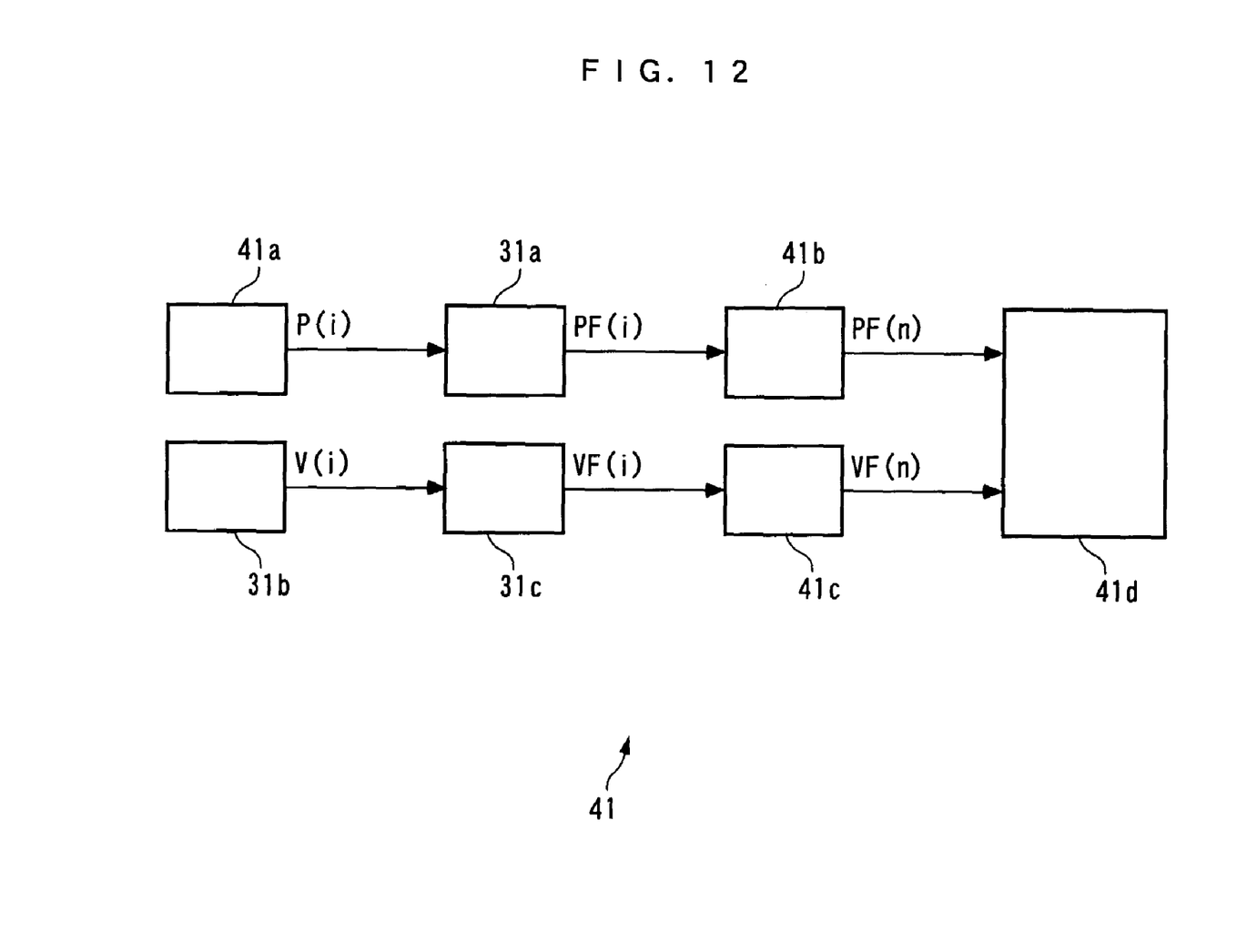
FIG. 12 is a schematic block diagram of a calculation device according to a third embodiment of the present invention.

Next, a calculation device 41 for calculating the indicated mean effective pressure $P_{mi}$ by a calculation method according to a third embodiment of the present invention will be described with reference to FIG. 12. The present embodiment is distinguished from the above-described second embodiment in that the in-cylinder pressure filtered value PF and the volume data filtered value VF are down-sampled whenever the first CRK signal is outputted, and used for calculation of the indicated mean effective pressure $P_{mi}$. In FIG. 12, component elements identical to those of the calculation device 31 according to the second embodiment are designated by identical reference numerals. In the following, a description will be mainly given of the different points.

In the calculation device 41, first, a sampler 41a samples the in-cylinder pressure data P whenever the above-described second CRK signal is inputted, that is, whenever the crankshaft 3c rotates through 1°, and outputs the sampled in-cylinder pressure data P(i) to the in-cylinder pressure filter 31a. As described hereinabove, the in-cylinder pressure filter 31a generates the in-cylinder pressure filtered value PF(i) (in-cylinder pressure data subjected to the second filtering process), and outputs the same to a down-sampler 41b.

The down-sampler 41b thins the input in-cylinder pressure filtered value PF(i) by down-sampling the same whenever the first CRK signal is inputted, that is, at a repetition period longer than a sampling period of the sampler 41a, and outputs the down-sampled in-cylinder pressure filtered value PF(n) (in-cylinder pressure data sampled at a second repetition period) to an indicated mean effective pressure-calculating section 41d, described hereinafter.

Further, the aforementioned cutoff frequency fc' of the in-cylinder pressure filter 31a is set to a value not higher than a half of a sampling frequency of the down-sampler 41b (hereinafter referred to as "the down-sampling frequency). As a result, when the in-cylinder pressure filtered value PF(i) is generated before it is down-sampled by the down-sampler 41b, components thereof in a frequency range not lower than a half of the down-sampling frequency are eliminated.

On the other hand, a sampler 41c samples the volume data filtered value VF(i) generated by the volume data filter 31c, as described above, whenever the first CRK signal is inputted, and outputs the sampled volume data filtered value VF(n) to the indicated mean effective pressure-calculating section 41d.

Then, the indicated mean effective pressure-calculating section 41d calculates the indicated mean effective pressure $P_{mi}$ based on the input in-cylinder pressure filtered value PF(n) and volume data filtered value VF(n) by the following equation (28):

$$P_{mi} = \frac{1}{V_S} \sum_{n=0}^{N-1} PF(n)\{VF(n) - VF(n-1)\} \quad (28)$$

As described above, according to the present embodiment, the in-cylinder pressure data P is filtered by the in-cylinder pressure filter 31a before it is down-sampled whenever the first CRK signal is inputted, whereby components thereof in the frequency range not lower than the half of the down-sampling frequency are eliminated in advance. This makes it possible to prevent aliasing from being caused by down-sampling of the in-cylinder pressure filtered value PF, thereby making it possible to prevent distortion of the in-cylinder pressure filtered value PF caused by the aliasing.

Further, similarly to the second embodiment, the volume data V is filtered by the volume data filter 31c having the same characteristic as that of the in-cylinder pressure filter 31a, and hence it is possible to eliminate the relative phase deviation between the in-cylinder pressure filtered value PF and the volume data filtered value VF, thereby making it possible to properly compensating for the phase delay of the in-cylinder pressure filtered value PF. Therefore, it is possible to calculate the indicated mean effective pressure $P_{mi}$ with accuracy while preventing aliasing and properly compensating for the phase delay of the in-cylinder pressure filtered value PF. Furthermore, since the in-cylinder pressure filtered value PF(n) down-sampled whenever the first CRK signal is inputted is used for calculation of the indicated mean effective pressure $P_{mi}$, the number of data items necessary for the calculation can be reduced to thin the data, thereby making it possible to decrease computation load of the indicated mean effective pressure $P_{mi}$.

Although in the present embodiment, to impart the same phase delay as the phase delay of the in-cylinder pressure data P to the volume data V, the volume data V is generated whenever the second CRK signal is inputted, and filtered by the volume data filter 31c, this is not limitative, but the volume data V may be generated whenever the first CRK signal is inputted, and filtered by a filter having the same characteristic as that of the in-cylinder pressure filter 31a.

Further, although in the present embodiment, the volume data V is filtered, the volume change rate data dV determined based on the volume data V may be filtered instead of the volume data V. Furthermore, although in the present embodiment, the cutoff frequency fc' of the in-cylinder pressure filter 31a is set to a value not higher than a half of the down-sampling frequency, this is not limitative, but it may be set to a value not lower than the half of the down-sampling frequency so long as the result of calculation of the indicated mean effective pressure $P_{mi}$ is not affected by aliasing. Further, similarly to the present embodiment, the first embodiment as well may be configured such that aliasing is prevented from being caused by filtering the in-cylinder pressure data P using the in-cylinder pressure filter 21 before it is sampled whenever the first CRK signal is outputted.

It should be noted that the present invention is not limited to the above-described embodiments, but can be practiced in various forms. For example, although in the above-described embodiments, the in-cylinder pressure filter 21, the cosine wave and sine wave filters 23 and 25, the in-cylinder pressure filter 31a, and the volume data filter 31c are configured to have the same characteristic, they may be configured to have approximately the same characteristic instead. In this case as well, it is possible to obtain substantially the same advantageous effects as provided by the above-described embodiments. Further, although in the above-described embodiments, a low-pass filter is used as the filter for filtering the in-cylinder pressure data P, a bandpass filter may be used instead which allows components of the in-cylinder pressure data P in a frequency band from a value of approximately 0 to a predetermined low frequency value to pass therethrough.

Furthermore, although the above-described embodiments are examples in which the in-cylinder pressure data P is subjected to a filtering process, this is not limitative, but also when the in-cylinder pressure data P is not subjected to the filtering process, the cosine wave Ck, the sine wave Sk, and the volume data V may be subjected to filtering processes. In this case, it is desirable to impart the same phase delay as the phase delay of the in-cylinder pressure data P, caused by any other cause than the filtering process on the in-cylinder pressure data P, such as response delay of the in-cylinder pressure sensor 11, to the cosine and sine waves Ck and Sk and the volume data V. This makes it possible to calculate the indicated mean effective pressure $P_{mi}$ with accuracy while properly compensating for phase delay of the in-cylinder pressure data P, caused by any other cause than the filtering process on the in-cylinder pressure data P. Further, although in the above-described embodiments, the indicated mean effective pressure $P_{mi}$ is calculated as a work amount parameter, this is not limitative, but an indicated power or torque of the engine 3 may be calculated based on the calculated indicated mean effective pressure $P_{mi}$. Furthermore, although the above-described embodiments are examples in which the present invention is applied to the engine 3 installed on a vehicle, this is not limitative, but the present invention can be applied to various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A method of calculating a work amount parameter indicative of an amount of work done by an internal combustion engine having a combustion chamber, comprising the steps of:
   - detecting pressure in the combustion chamber to obtain in-cylinder pressure data indicative of the detected pressure;
   - subjecting a predetermined reference signal which is at least one of a cosine wave signal and sine wave signal to a first predetermined filtering process; and
   - calculating the work amount parameter based on the in-cylinder pressure data and the wave signal subjected to the first filtering process.

2. A method as claimed in claim 1, further comprising the steps of:
   - calculating a correlation coefficient between the in-cylinder pressure data and the reference signal based on the in-cylinder pressure data and the reference signal subjected to the first filtering process; and
   - calculating the work amount parameter based on the calculated correlation coefficient.

3. A method as claimed in claim 2, further comprising the steps of:
   - sampling the in-cylinder pressure data at a first predetermined repetition period;
   - subjecting the sampled in-cylinder pressure data to a second predetermined filtering process;
   - sampling the in-cylinder pressure data subjected to the second filtering process at a second predetermined repetition period longer than the first repetition period; and
   - using the in-cylinder pressure data sampled at the second predetermined repetition period for calculation of the work amount parameter.

4. A method of calculating a work amount parameter indicative of an amount of work done by an internal combustion engine having a combustion chamber, comprising the steps of:
   - detecting pressure in the combustion chamber to obtain in-cylinder pressure data indicative of the detected pressure;
   - subjecting the obtained in-cylinder pressure data to a second predetermined filtering process.
   - obtaining volume data indicative of a rate of change in volume of the combustion chamber;
   - subjecting the obtained volume data to a first predetermined filtering process having the same filtering characteristics as that of the second predetermined filtering process; and
   - calculating the work amount parameter based on the in-cylinder pressure data subjected to the second filtering process and the volume data subjected to the first filtering process.

5. A method as claimed in claim 4, further comprising the steps of:
   - sampling the in-cylinder pressure data at a first predetermined repetition period;
   - subjecting the sampled in-cylinder pressure data to the second predetermined filtering process;
   - sampling the in-cylinder pressure data subjected to the second predetermined filtering process at a second predetermined repetition period longer than the first repetition period; and
   - using the in-cylinder pressure data sampled at the second predetermined repetition period for calculation of the work amount parameter.

* * * * *